(12) United States Patent
Bai

(10) Patent No.: US 8,398,329 B2
(45) Date of Patent: Mar. 19, 2013

(54) SAFETY DEVICE USED IN COMBINATION WITH CHILD SEAT ASSEMBLY

(75) Inventor: Hongtai Bai, Taipei (TW)

(73) Assignee: BP Children's Products HK Co., Limited, Kowloon (HK)

( * ) Notice: Subject to any disclaimer, the term of this patent is extended or adjusted under 35 U.S.C. 154(b) by 386 days.

(21) Appl. No.: 12/656,467

(22) Filed: Feb. 1, 2010

(65) Prior Publication Data

US 2011/0012407 A1   Jan. 20, 2011

(30) Foreign Application Priority Data

Jul. 20, 2009   (CN) .......................... 2009 1 0164789

(51) Int. Cl.
*F16D 1/00*   (2006.01)
(52) U.S. Cl. ......... 403/324; 403/325; 297/487; 297/467
(58) Field of Classification Search .................. 297/467, 297/487, 488; 105/149.2; 104/55, 56, 63, 104/64; 472/118, 119, 43, 133; 403/324, 403/322.1, 327, 325, 326, 321, 329
See application file for complete search history.

(56) References Cited

U.S. PATENT DOCUMENTS

| | | | | |
|---|---|---|---|---|
| 2,187,372 A | * | 1/1940 | Capaldo ........................... | 135/24 |
| 2,933,340 A | * | 4/1960 | McDiarmid ............... | 294/82.32 |
| 4,440,414 A | * | 4/1984 | Wang ............................. | 280/287 |
| 4,813,746 A | * | 3/1989 | Mulholland .................. | 297/488 |
| 4,858,991 A | * | 8/1989 | Boyesen .................. | 297/195.11 |
| 5,129,478 A | * | 7/1992 | Suenaga et al. ............... | 180/268 |
| 5,183,315 A | * | 2/1993 | Takahashi et al. ............ | 297/488 |
| 5,294,182 A | * | 3/1994 | Colasanti ...................... | 297/467 |
| 5,334,099 A | * | 8/1994 | Marra et al. .................. | 472/118 |
| 5,433,153 A | * | 7/1995 | Yamada .......................... | 104/63 |
| 5,533,786 A | * | 7/1996 | Cone, II .................. | 297/256.15 |
| 5,558,405 A | * | 9/1996 | Ishikura et al. ............... | 297/487 |
| 5,611,638 A | * | 3/1997 | Dorr et al. ..................... | 403/327 |
| 5,645,317 A | * | 7/1997 | Onishi et al. .............. | 297/250.1 |
| 5,806,933 A | * | 9/1998 | Tsui et al. ..................... | 297/391 |
| 5,964,545 A | * | 10/1999 | Cheng .......................... | 403/102 |
| 5,978,987 A | * | 11/1999 | Wang ............................... | 5/99.1 |
| 5,988,928 A | * | 11/1999 | Cheng .......................... | 403/102 |
| 6,287,211 B1 | * | 9/2001 | Bolliger et al. ................ | 472/43 |
| 6,565,154 B2 | * | 5/2003 | Davis ............................ | 297/352 |
| 7,810,883 B2 | * | 10/2010 | Berger et al. ............. | 297/256.1 |
| 7,958,601 B2 | * | 6/2011 | Yu et al. .......................... | 16/343 |
| 2001/0011838 A1 | * | 8/2001 | Kassai et al. .............. | 297/250.1 |
| 2005/0242653 A1 | * | 11/2005 | Chou ............................ | 297/487 |
| 2005/0276562 A1 | * | 12/2005 | Battey et al. ................. | 385/135 |
| 2006/0181136 A1 | * | 8/2006 | Gaffney ....................... | 297/487 |
| 2009/0134689 A1 | * | 5/2009 | Opsvik ......................... | 297/467 |

FOREIGN PATENT DOCUMENTS

| GB | 2277869 A | * 11/1994 |
|---|---|---|
| JP | 2005326626 A | * 12/2005 |

* cited by examiner

*Primary Examiner* — David Dunn
*Assistant Examiner* — David E Allred
(74) *Attorney, Agent, or Firm* — Bacon & Thomas, PLLC

(57) ABSTRACT

A safety device used in combination with a child seat assembly is provided to solve the problems about complicated structure and risk for the children. The safety device includes a bracket, a first wing and a second wing pivotally connected to the head portion of the bracket, a flexible piece cooperating the first and second wings, a locking piece releasably engaged with the first and second wings. When one of the wings is pivotally rotated, both of the wings will be synchronously rotated to a vertical or horizontal state.

8 Claims, 10 Drawing Sheets

SAFETY DEVICE USED IN COMBINATION WITH CHILD SEAT ASSEMBLY

FIELD OF THE INVENTION

The present invention generally relates to a safety device, and more particularly to a safety device used in combination with a child seat assembly.

BACKGROUND OF THE INVENTION

FIG. 1 shows a conventional safety mechanism 1 disclosed in the U.S. Pat. No. 5,533,786. A pivot (not shown) is installed within the bottom of the safety mechanism 1. The safety mechanism 1 can be pivotally rotated outward and downward about the pivot. Hence, the child within a conventional seat assembly 2 can be easily taken out of the conventional seat assembly 2.

However, the structure for the safety mechanism 1 to be mounted to the conventional seat assembly 2 is very complicated. Besides, when the safety mechanism 1 is pivotally rotated to a position under the conventional seat assembly 2, there is no barrier to the child within the conventional seat assembly 2. In this situation, the child may fall out of the conventional seat assembly 2 before the child is carried out of.

SUMMARY OF THE INVENTION

Accordingly, the present invention relates to a safety device used in combination with a child seat assembly that is substantially intended to obviate one or more of the problems due to the limitations and disadvantages encountered in the prior art.

One object of the present invention is to provide a safety device used in combination with a child seat assembly, where the structure of the safety device for being mounted to the child seat assembly is simple.

Another object of the present invention is to provide a safety device used in combination with a child seat assembly, where there is still a barrier to prevent the child from falling out of the seat assembly when the safety device is released.

Yet another object of the present invention is to provide a safety device used in combination with a child seat assembly, where two wings can be substantially rotated synchronously.

Additional features and advantages of the invention will be set forth in the description which follows, and in portion will be apparent from the description, or may be learned by practice of the invention. The objectives and advantages of the invention will be realized and attained by the structure as particularly set forth in the written description and claims as well as illustrated in the appended drawings.

To achieve these and other advantages and according to the purpose of the present invention, as embodied and broadly described, a safety device used in combination with a child seat assembly comprises: a bracket; a first wing pivotally connected to the bracket; a second wing pivotally connected to the bracket; and a locking piece movably mounted to the bracket and releasably engaged with the first wing and the second wing; wherein the first wing and the second wing cannot be pivotally rotated relative to the bracket when the locking piece is engaged with the first wing and the second wing; the first wing and the second wing can be pivotally rotated relative to the bracket when the locking piece is released from the first wing and the second wing.

In a preferred aspect, the safety device further comprises a flexible piece; the flexible piece is connected to and cooperates with the first and second wings.

Moreover, the first wing includes a first flange; the second wing includes a second flange; the flexible piece is in an 8-shape and provided at outer edges of the first flange and the second flange.

It is another preferred feature that the safety device further comprises a first stud and a second stud secured to the flexible piece; the first stud and the second stud are respectively secured to the first and second wings.

Additionally, the locking piece includes a protrusion; the first wing includes a first notch; the second wing includes a second notch; the protrusion is releasably engaged with the first and second notches.

Furthermore, the locking piece includes a key; the bracket includes a groove; the key is slidably received in the groove.

It is preferred that the safety device further comprises a resilient rib formed at an end of the bracket.

It is preferred that the safety device further comprises a cap and an elastic piece mounted between the cap and the locking piece.

Another aspect of this invention directs to a child seat assembly comprising a seat portion and a safety device mounted to the seat portion. The safety device includes: a bracket mounted to the seat portion; a first wing pivotally connected to the bracket; a second wing pivotally connected to the bracket; and a locking piece movably mounted to the bracket, the locking piece being movable between a locking position and a releasing position relative to the bracket; wherein the first wing and the second wing cannot be pivotally rotated relative to the bracket and the first wing and the second wing are in a horizontal state when the locking piece is at the locking position relative to the bracket; the first wing and the second wing can be pivotally rotated relative to the bracket to a vertical state when the locking piece is at the releasing position relative to the bracket.

It is preferred that the safety device further includes an 8-shaped flexible piece; two halves of the flexible piece respectively surround the first and second wings so as to cooperate the first and second wings.

It is preferred that the locking piece includes a protrusion; the first wing includes a first notch; the second wing includes a second notch; the protrusion is engaged with the first and second notches when the locking piece is at the locking position relative to the bracket.

It is preferred that the locking piece includes a key; the bracket includes a groove; the key is slidably received in the groove to allow the locking piece slidable between the locking position and the releasing position.

It is preferred that the first wing, the second wing and the bracket construct a T shape when the first wing and the second wing are at the horizontal state; the first wing, the second wing and the bracket are in parallel when the first wing and the second wing are at the vertical state.

It is to be understood that both the foregoing general description and the following detailed description are exemplary and explanatory and are intended to provide a further non-limiting explanation of the invention as claimed.

BRIEF DESCRIPTION OF THE DRAWINGS

The accompanying drawings, which are included to provide a further understanding of the invention and constitute a portion of the specification, illustrate embodiments of the invention and together with the description serve to explain the principle of the invention. In the drawings.

DETAILED DESCRIPTION OF THE INVENTION

Figure 1:
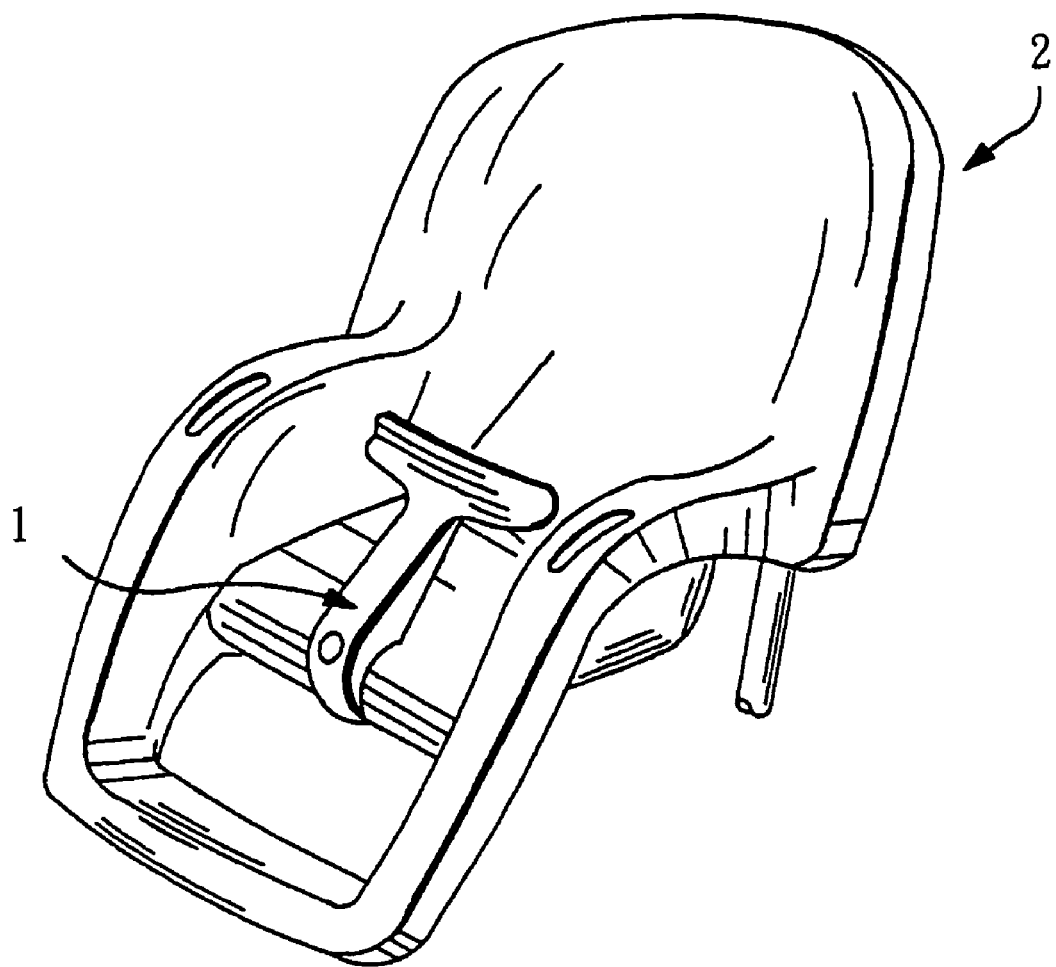
FIG. 1 is an assembled perspective view illustrating a conventional seat assembly and safety mechanism.
Figure 2:
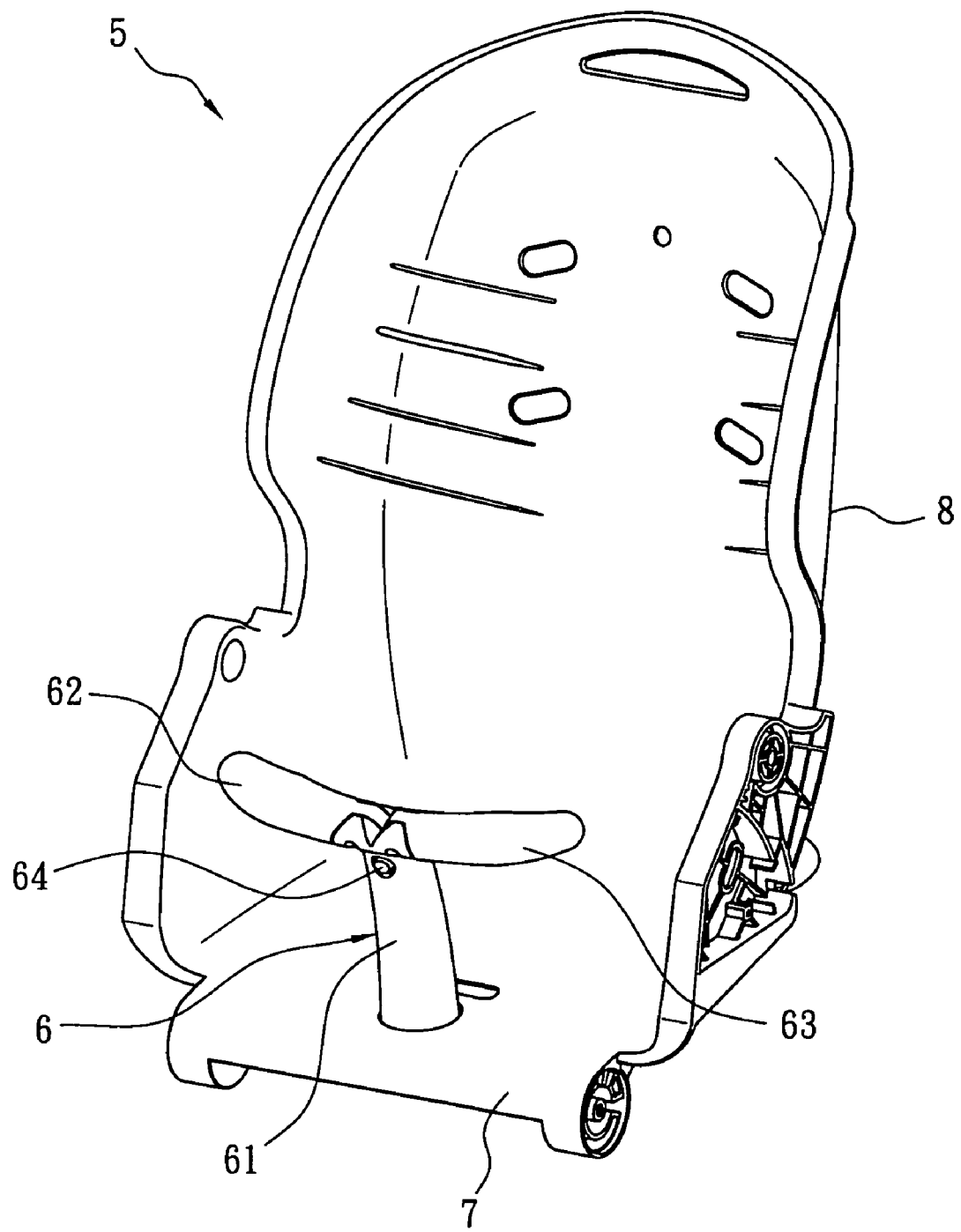
FIG. 2 is an assembled perspective view illustrating a child seat assembly and a safety device thereof according to an embodiment of the present invention.
Figure 3:
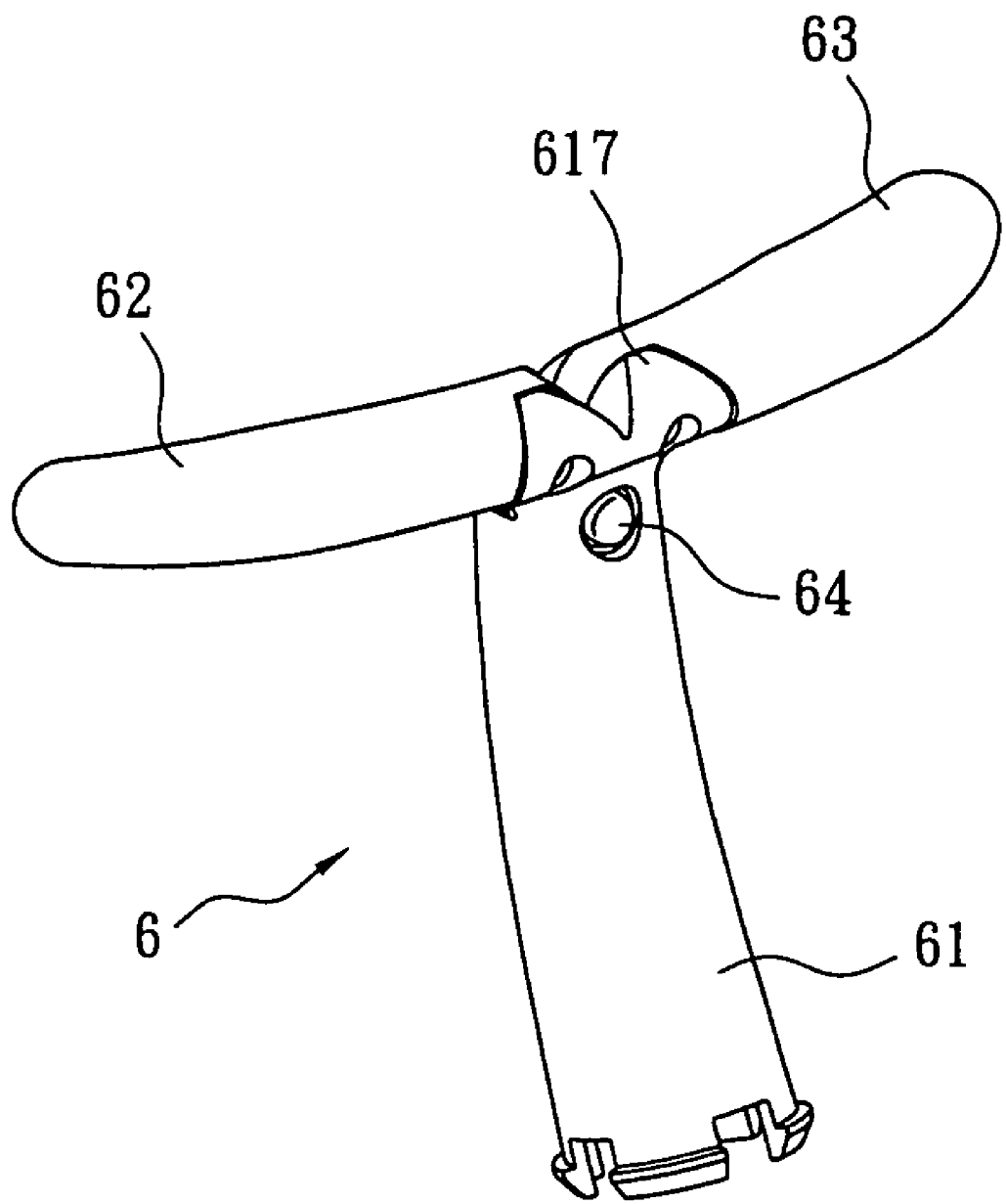
FIG. 3 an assembled perspective view illustrating a safety device according to the embodiment of the present invention.
Figure 4:
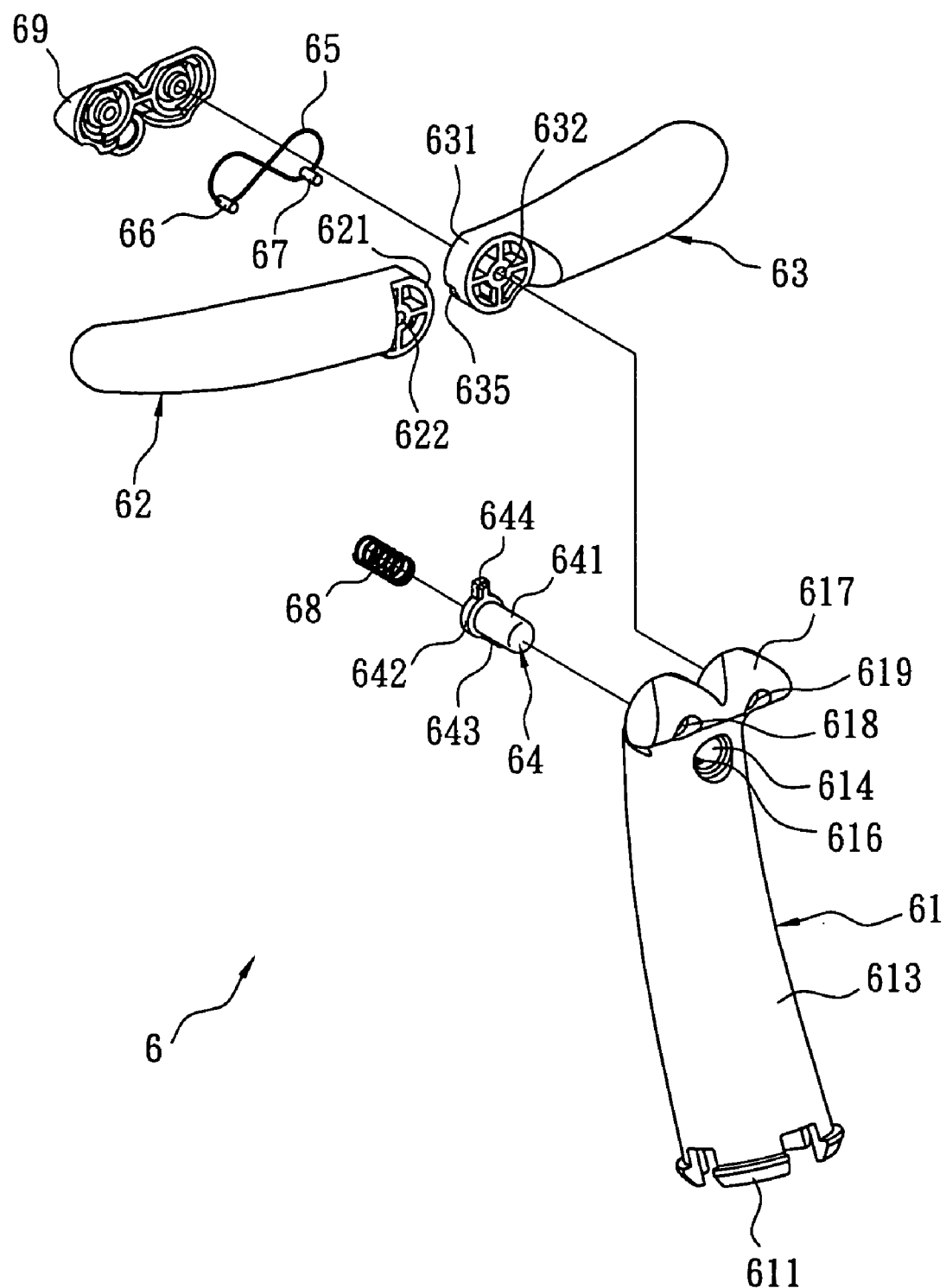
FIG. 4 an exploded perspective view illustrating a safety device according to the embodiment of the present invention.
Figure 7:
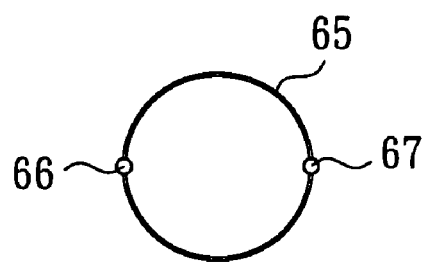
FIG. 7 is a front view illustrating a flexible piece before being twisted according to the embodiment of the present invention.

As shown in FIGS. 2, 3 and 4, the child seat assembly 5 according to an embodiment of this invention includes a seat portion 7, a backrest 8 connected to the rear end of the seat portion 7, and a safety device 6 mounted to the front end of the seat portion 7. The safety device 6 includes a bracket 61 for example in a rod shape, a first wing 62, a second wing 63, a locking piece 64, a flexible piece 65 for example made of a ring of steel wire (FIG. 7), a first stud 66, a second stud 67, an elastic piece 68 such as a spring, and a cap 69. The first stud 66 and the second stud 67 are, for example, welded and secured to the flexible piece 65 at two ends of one diameter of the ring. Alternatively, the first stud 66 and the second stud 67 may be integrally formed on the flexible piece 65.

Figure 5:
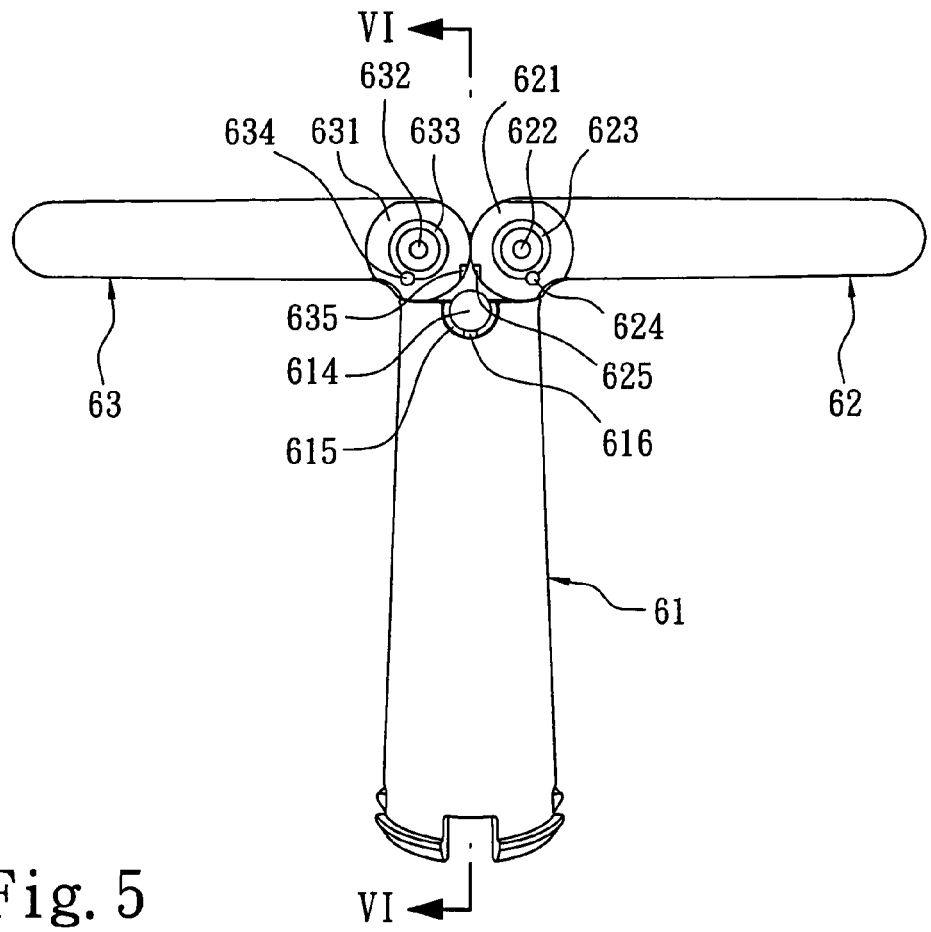
FIG. 5 is a rear view illustrating a safety device without a locking piece and a flexible piece according to the embodiment of the present invention.
Figure 6:
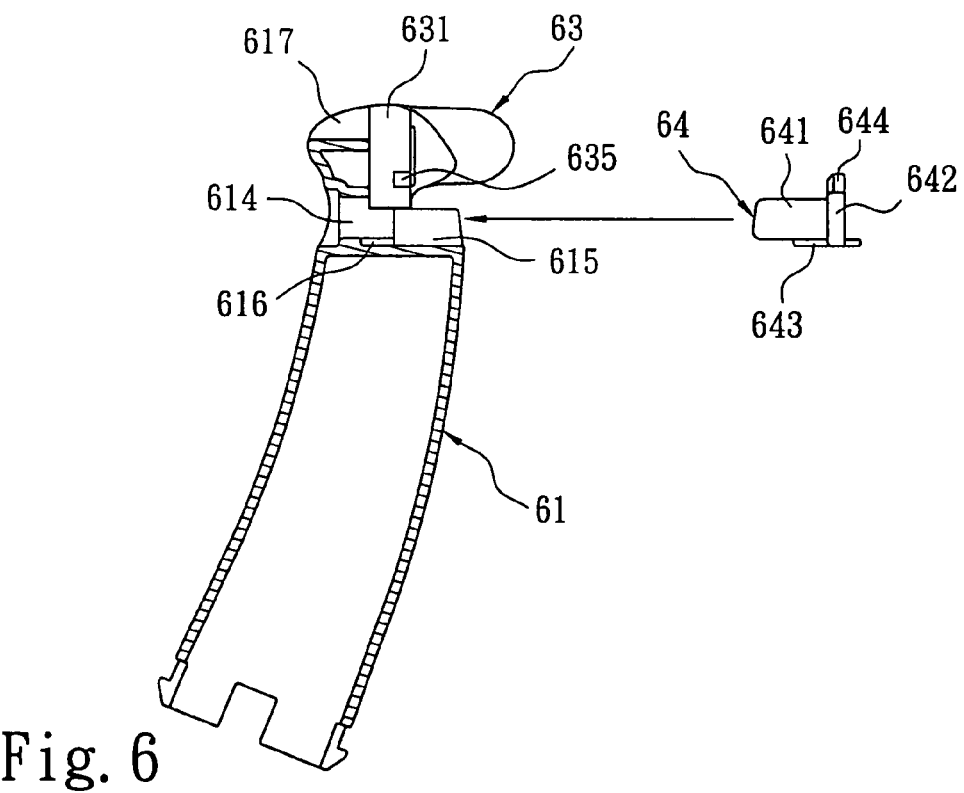
FIG. 6 is a sectional view taken from a line VI-VI in the FIG. 5.

As shown in FIGS. 4, 5 and 6, the bracket 61, from bottom to top, includes resilient ribs 611, a strut portion 613, a first hole 614 formed in the strut portion 613, a second hole 615, a groove 616, a head portion 617, a first bore 618 formed in the head portion 617, and a second bore 619 formed in the head portion 617. The second hole 615 and the first hole 614 are coaxial or concentric. The diameter of the second hole 615 is larger than that of the first hole 614. The groove 616 is formed in the strut portion 613 and communicated with the first hole 614 as well as the second hole 615.

Figure 8:
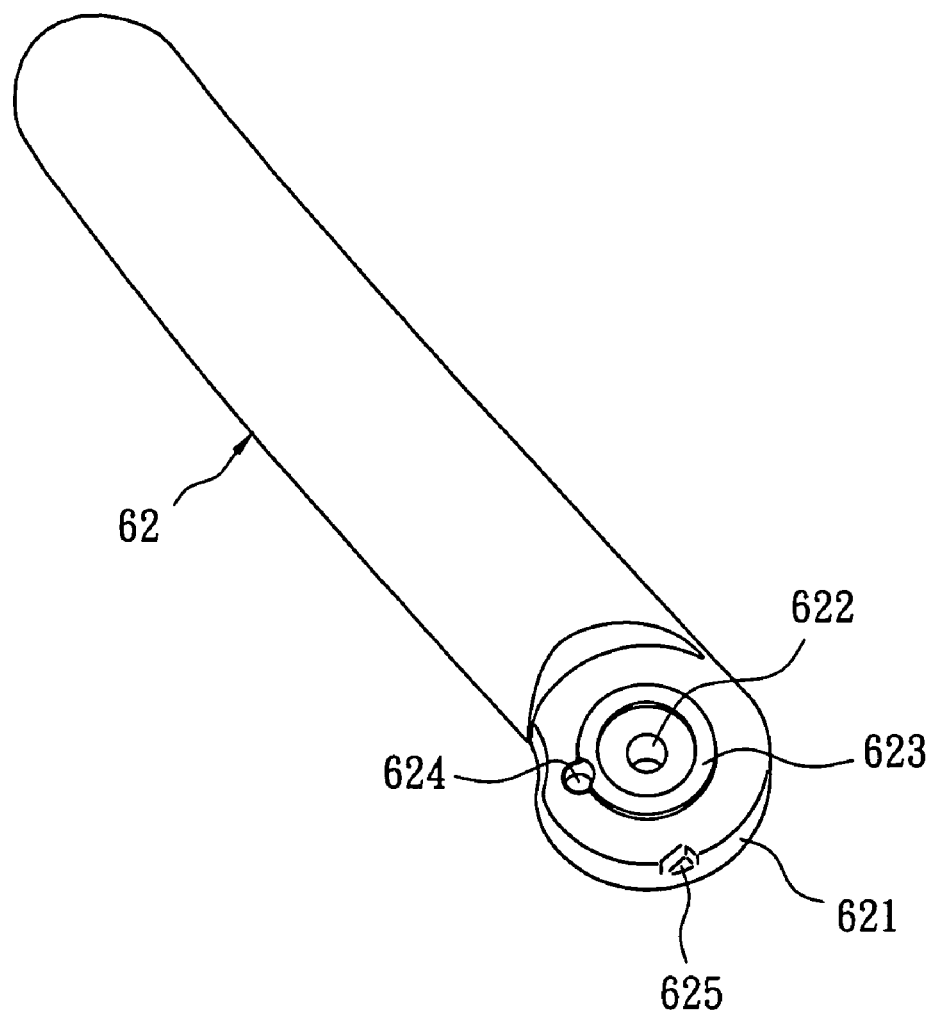
FIG. 8 is a perspective view illustrating a first wing according to the embodiment of the present invention.

As shown in FIG. 8, the first wing 62 includes an arc-shaped first ear portion 621 situated at one end of the first wing 62, a first aperture 622 formed at the center of the first ear portion 621, a ring-shaped first flange 623 protruding from the surface of the first ear portion 621, a first orifice 624 formed at the outer edge of the first flange 623 and partly hollowing out the first flange 623, and a first notch 625 formed at the periphery of the first ear portion 621.

As shown in FIGS. 4, 5 and 8, the second wing 63 is similar to the first wing 62. In other words, the second wing 63 includes an arc-shaped second ear portion 631 situated at one end of the second wing 63, a second aperture 632 formed at the center of the second ear portion 631, a ring-shaped second flange 633 protruding from the surface of the second ear portion 631, a second orifice 634 formed at the outer edge of the second flange 633 and partly hollowing out the second flange 633, and a second notch 635 formed at the periphery of the second ear portion 631.

As shown in FIGS. 4 and 6, the locking piece 64 includes a first shaft portion 641, a second shaft portion 642 being coaxial or concentric with the first shaft portion 641, a key 643 extending downward from the first shaft portion 641, and a protrusion 644 extending upward from the second shaft portion 642. The diameter of the second shaft portion 642 is larger than that of the first shaft portion 641.

Installation

As shown in FIGS. 4, 5, 6 and 9, a first pin (not shown), such as a bolt or rivet, is first used to pass through the first bore 618 in the bracket 61 and the first aperture 622 in the first wing 62. Next, a second pin (not shown), such as a bolt or rivet, is used to pass through the second bore 619 in the bracket 61 and the second aperture 632 in the second wing 63.

The first shaft portion 641 of the locking piece 64 is inserted into the second hole 615 of the bracket 61 until the free end of the first shaft portion 641 is extended outside the first hole 614 and the key 643 is received in the groove 616. The free end of the first shaft portion 641 is protruded out the surface of the strut portion 613 and the protrusion 644 of the locking piece 64 is engaged with the first notch 625 of the first wing 62 and the second notch 635 of the second wing 63. In this situation, the first wing 62 and the second wing 63 are substantially collinear. The first wing 62, the second wing 63 and the bracket 61 substantially construct a T-shape.

The ring-shaped flexible piece 65 (FIG. 7) is then twisted into an 8-shape (FIG. 4). Sequentially, the first stud 66 and the second stud 67 secured on the flexible piece 65 are respectively inserted into the first orifice 624 of the first wing 62 and the second orifice 634 of the second wing 63. Simultaneously, the upper half and lower half of the 8-shaped flexible piece 65 are respectively put around the first flange 623 of the first wing 62 and the second flange 633 of the second wing 63.

Figure 9:
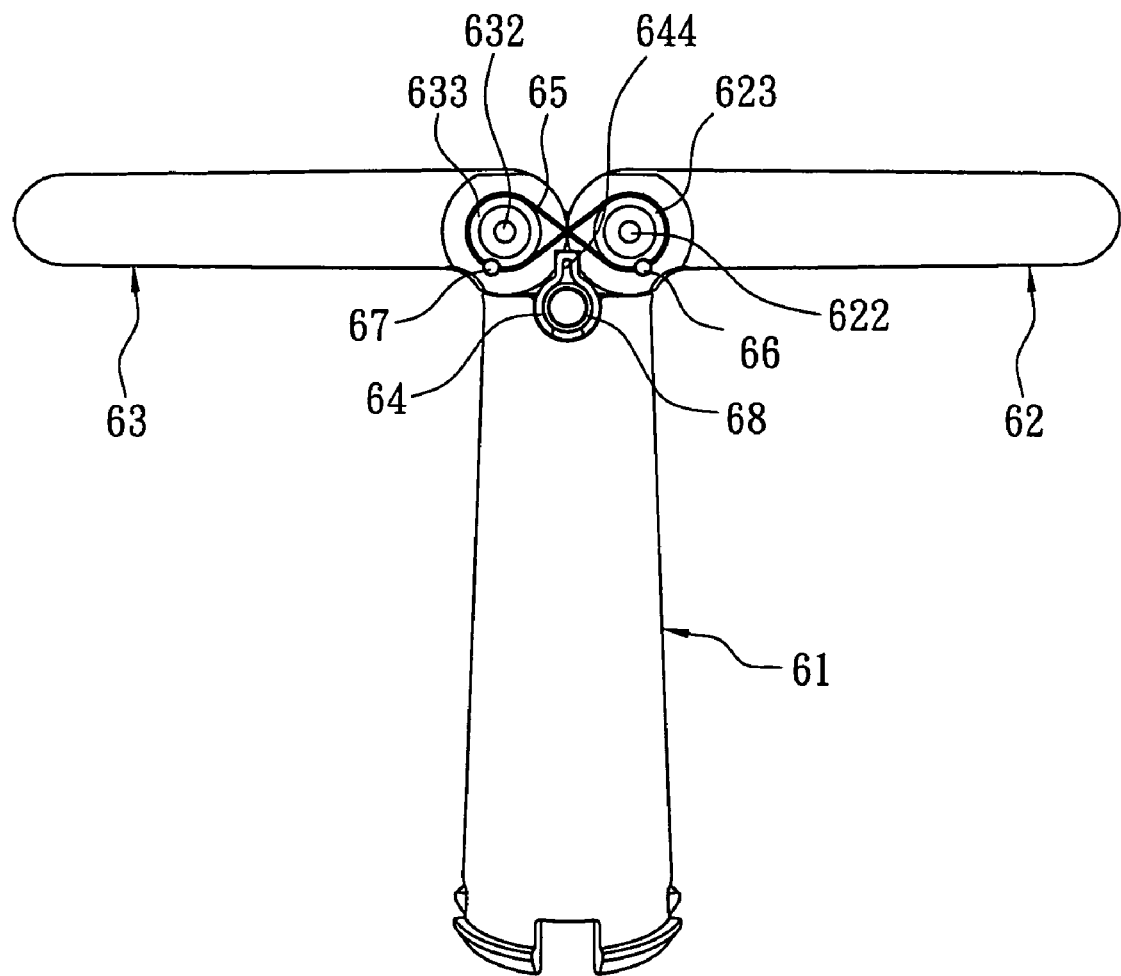
FIG. 9 a rear view illustrating a safety device with a locking piece and a flexible piece but without a cap according to the embodiment of the present invention.
Figure 10:
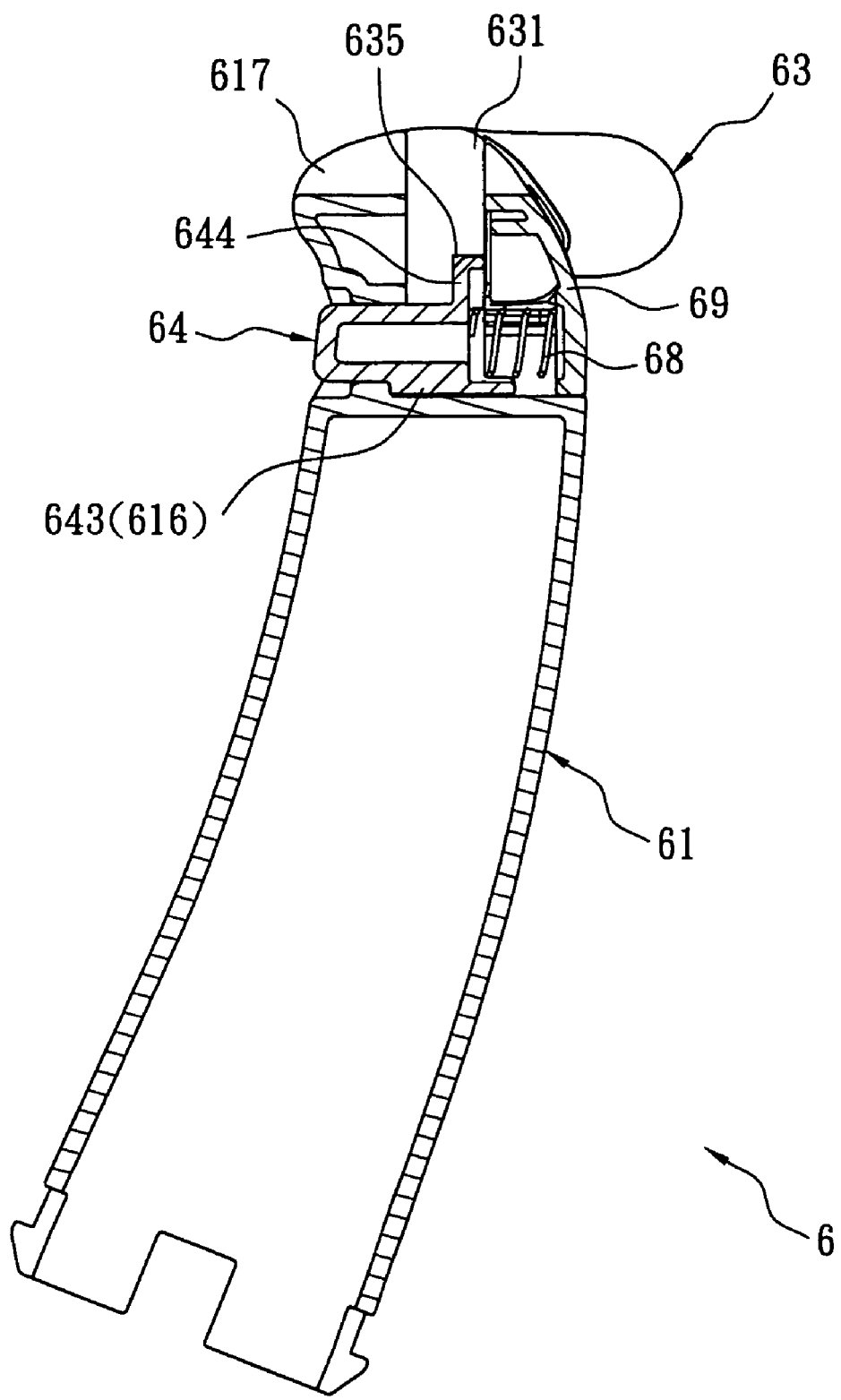
FIG. 10 is a sectional view taken in the longitudinal direction of the bracket of the safety device according to the embodiment of the present invention, and illustrating a state that the locking piece is not pushed.

As shown in FIGS. 4, 9 and 10, the elastic piece 68 is then put into the second hole 615 of the bracket 61 to urge against the second shaft portion 642 of the locking piece 64. Next, the cap 69 is used to cover the elastic piece 68, the first ear portion 621 of the first wing 62 and the second ear portion 631 of the second wing 63. Finally, the first and second pins are secured to the cap 69.

As shown in FIGS. 2, 9 and 10, the resilient ribs 611 of the safety device 6 may be inserted through the seat portion 5 until it was extended and engaged with the under surface of the seat portion 5. Therefore, the safety device 6 assembled according to the steps mentioned above can be further fixedly mounted to the seat portion 5 of the child seat assembly 5.

Operation

As shown in FIGS. 2, 5, 9 and 10, when a child is sitting in the child seat assembly 5, the safety device is in the T-shape. In this situation, the protrusion 644 of the locking piece 64 is received within the first notch 625 of the first wing 62 and the second notch 635 of the second wing 63. The first wing 62 and the second wing 63 cannot be pivotally rotated relative to each other. The first wing 62 and the second wing 63 cannot be pivotally rotated relative to the bracket 61, neither. The first wing 62 and the second wing 63 are substantially collinear and in a horizontal state. The first wing 62, the second wing 63 and the bracket 61 construct a T shape. The legs of the child respectively pass through the spaces between the first and second wings 62, 63 and the seat portion 7. Hence, the safety device 6 can prevent the child in the child seat assembly 5 from falling out of the child seat assembly 5.

Figure 11:
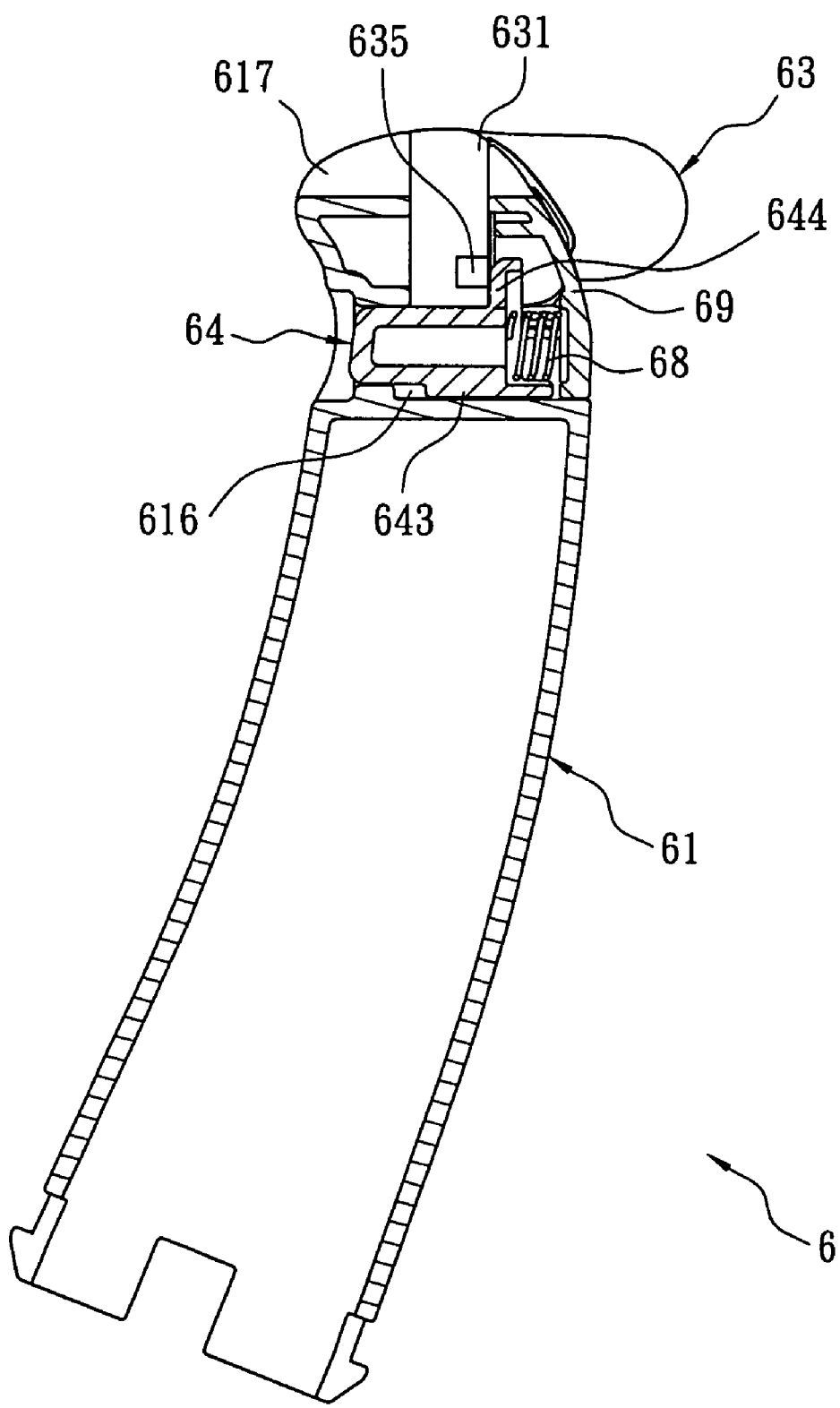
FIG. 11 is a sectional view similar to the FIG. 10 and illustrates a state that the locking piece is pressed.
Figure 12:
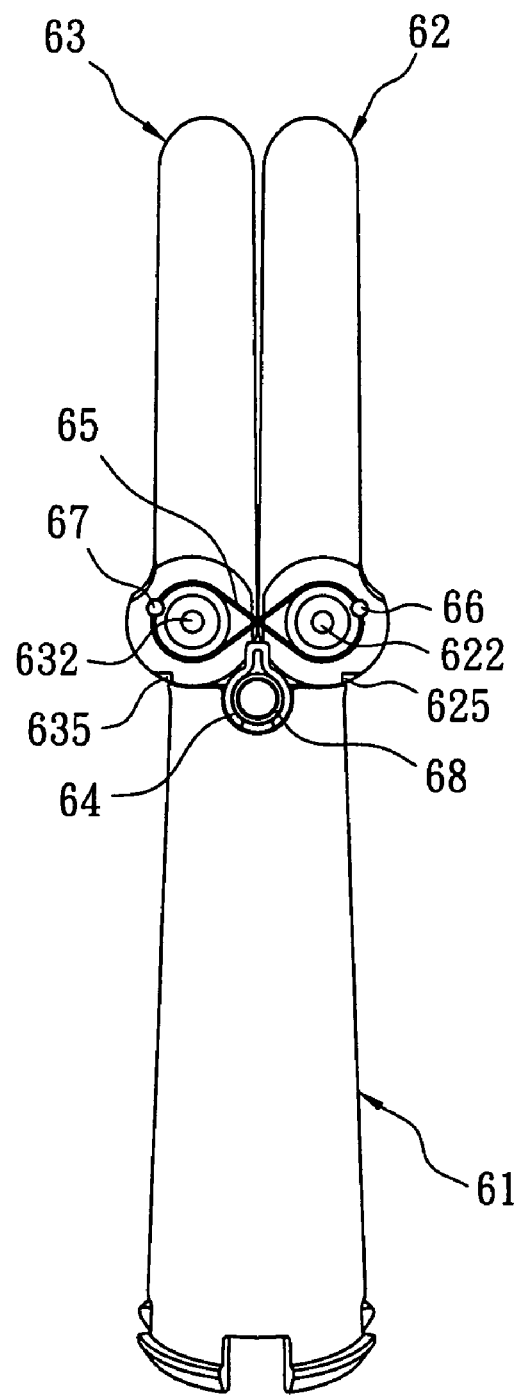
FIG. 12 is a rear view similar to the FIG. 9 but illustrates the locking piece is pressed and the wings are pivotally rotated.

As shown in FIGS. 11 and 12, when it is desired to carry the child out of the child seat assembly 5, the first shaft portion 641 of the locking piece 64 is pressed so that the protrusion 644 is removed from the first notch 625 and the second notch 635. In this situation, the first wing 62 and the second wing 63 can be pivotally rotated relative to the bracket 61. Besides, since the first and second studs 66, 67 are respectively received in the first and second orifices 624, 634 and the thus the flexible piece 65 is attached to the first and second wings 62, 63 and cannot be moved relative to the first and second wings 62, 63. Hence, when one of the first and second wings 62, 63 is pivotally rotated, the other of the first and second wings 62, 63 will be rotated simultaneously by the flexible piece 65. Alternatively, the user may pivotally rotate both of the first and second wings 62, 63 simultaneously. When the first and second wings 62, 63 are pivotally rotated to a vertical state, that is, the longitudinal directions of the first and second wings 62, 63 are the same as the longitudinal directions of the bracket 61, the first wing 62 and the second wing 63 are substantially parallel, and the child can be carried out of the child seat assembly 5 upward or forward.

When the locking piece 64 is pressed to bring the protrusion 644 to remove from the first notch 625 and the second notch 635 and the first wing 62 or the second wing 63 is pivotally rotated a little bit, the protrusion 644 will abut against the surfaces of the first and second ear portions 621, 631. Therefore, even if the user does not press the locking piece 64 any more, the protrusion 644 cannot be engaged with the first and second notches 625, 635 again via the restoring force of the elastic piece 68. Besides, because the key 643 of the locking piece 64 is still received in the groove 616 of the bracket 61, the locking piece 64 cannot be rotated.

When the first or second wing 62, 63 is pivotally rotated downward from the vertical state, the first and second wings 62, 63 will be synchronously and pivotally rotated downward due to the cooperation of the flexible piece 65. When the first and second wings 62, 63 are pivotally rotated to the horizontal state, the locking piece 64 is biased by the elastic piece 68 so that the protrusion 644 is engaged with the first and second notches 625, 635 once more. The first and second wings 62, 63 are positioned at the horizontal state as shown in the FIG. 9.

This invention has been disclosed in terms of specific embodiments. It will be apparent that many modifications can be made to the disclosed structures without departing from the invention. Therefore, it is the intent of the appended claims to cover all such variations and modifications that are within the scope of this invention.

What is claimed is:

1. A safety device used in combination with a child seat assembly comprising:
    an elongated bracket defining a longitudinal direction along a length of the bracket;
    a first wing pivotally connected at a first connection to a first end of the bracket and defining a first pivotal axis which is substantially perpendicular to the longitudinal direction;
    a second wing pivotally connected at a second connection to the first end of the bracket; and
    a locking piece slidably mounted in a through hole in the bracket and releasably engaged with the first wing and the second wing by sliding movement in a direction substantially perpendicular to the longitudinal direction;
    wherein the first wing and the second wing cannot be pivotally rotated relative to the bracket when the locking piece is engaged with the first wing and the second wing; the first wing and the second wing can be pivotally rotated relative to the bracket when the locking piece is released from the first wing and the second wing.

2. The safety device used in combination with the child seat assembly as claimed in the claim 1, wherein the safety device further comprises a flexible piece; the flexible piece is connected to and cooperates with the first and second wings.

3. The safety device used in combination with the child seat assembly as claimed in the claim 2, wherein the first wing includes a first flange; the second wing includes a second flange; the flexible piece is in an 8-shape and provided at outer edges of the first flange and the second flange.

4. The safety device used in combination with the child seat assembly as claimed in the claim 3, wherein the safety device further comprises a first stud and a second stud secured to the flexible piece; the first stud and the second stud are respectively engaged with the first and second wings.

5. The safety device used in combination with the child seat assembly as claimed in the claim 1 wherein the locking piece includes a protrusion; the first wing includes a first notch; the second wing includes a second notch; the protrusion is releasably engaged with the first and second notches; the first wing cannot be pivotally rotated relative to the bracket when the protrusion is situated in the first notch.

6. The safety device used in combination with the child seat assembly as claimed in the claim 5, wherein the locking piece includes a key; the bracket includes a groove; the key is slidably received in the groove to prevent the locking piece from being rotated.

7. The safety device used in combination with the child seat assembly as claimed in the claim 5, wherein the safety device further comprises a resilient rib formed at a second end of the bracket for being engaged with the child seat.

8. The safety device used in combination with the child seat assembly as claimed in the claim 5, wherein the safety device further comprises a cap and an elastic piece mounted between the cap and the locking piece.

* * * * *